United States Patent [19]

Suenaga et al.

[11] Patent Number: 6,042,132
[45] Date of Patent: Mar. 28, 2000

[54] BICYCLE AND BICYCLE SPEED CHANGE OPERATION ASSEMBLY

[75] Inventors: Tomonori Suenaga; Yoshihisa Iwasaki, both of Tondabayashi, Japan

[73] Assignee: Sakae Co., Ltd., Tokyo, Japan

[21] Appl. No.: 08/737,274

[22] PCT Filed: Mar. 12, 1996

[86] PCT No.: PCT/JP96/00615

§ 371 Date: Nov. 6, 1996

§ 102(e) Date: Nov. 6, 1996

[87] PCT Pub. No.: WO96/28338

PCT Pub. Date: Sep. 19, 1996

[30] Foreign Application Priority Data

Mar. 13, 1995 [JP] Japan .................................. 7-053043

[51] Int. Cl.[7] .................................................. B62M 25/04
[52] U.S. Cl. ........................ 280/260; 74/502.2; 74/502.6; 74/551.8
[58] Field of Search .................................. 280/236, 238, 280/260, 259, 261; 74/551.8, 551.9, 502.2, 502.4, 502.6, 504, 508; 474/81

[56] References Cited

U.S. PATENT DOCUMENTS 4,859,984  8/1989  Romano .................................. 340/432
5,621,382  4/1997  Yamamoto .................................. 474/81
5,657,669  8/1997  Barnard .................................. 74/502.4

FOREIGN PATENT DOCUMENTS

| 0 641 711 | 3/1995 | European Pat. Off. | B62J 39/00 |
|---|---|---|---|
| 3-176290 | 7/1991 | Japan | B62M 25/04 |
| 5-193551 | 8/1993 | Japan | B62M 25/04 |
| 6-48366 | 2/1994 | Japan | B62M 25/04 |
| 6-51096 | 7/1994 | Japan | B62M 25/04 |
| 6-239287 | 8/1994 | Japan | B62M 25/04 |

*Primary Examiner*—Anne Marie Boehler
*Attorney, Agent, or Firm*—Michael D. Bednarek; Crowell & Moring LLP

[57] ABSTRACT

A bicycle comprises a front speed shifter having a plurality of speed stages, a rear speed shifter having at least three speed stages, a front speed change operation assembly 1A connected to the front speed shifter, and a rear speed change operation assembly 1B connected to the rear speed shifter. There are a plurality of designated groups of combinations for combining the speed stages of the front speed shifter with the speed stages of the rear speed shifter, and indication means 50a through 50c, 51a through 51c, and 59B for identifying each of these groups are provided for each of the front speed change operation assembly 1A and the rear speed change operation assembly 1B.

7 Claims, 14 Drawing Sheets

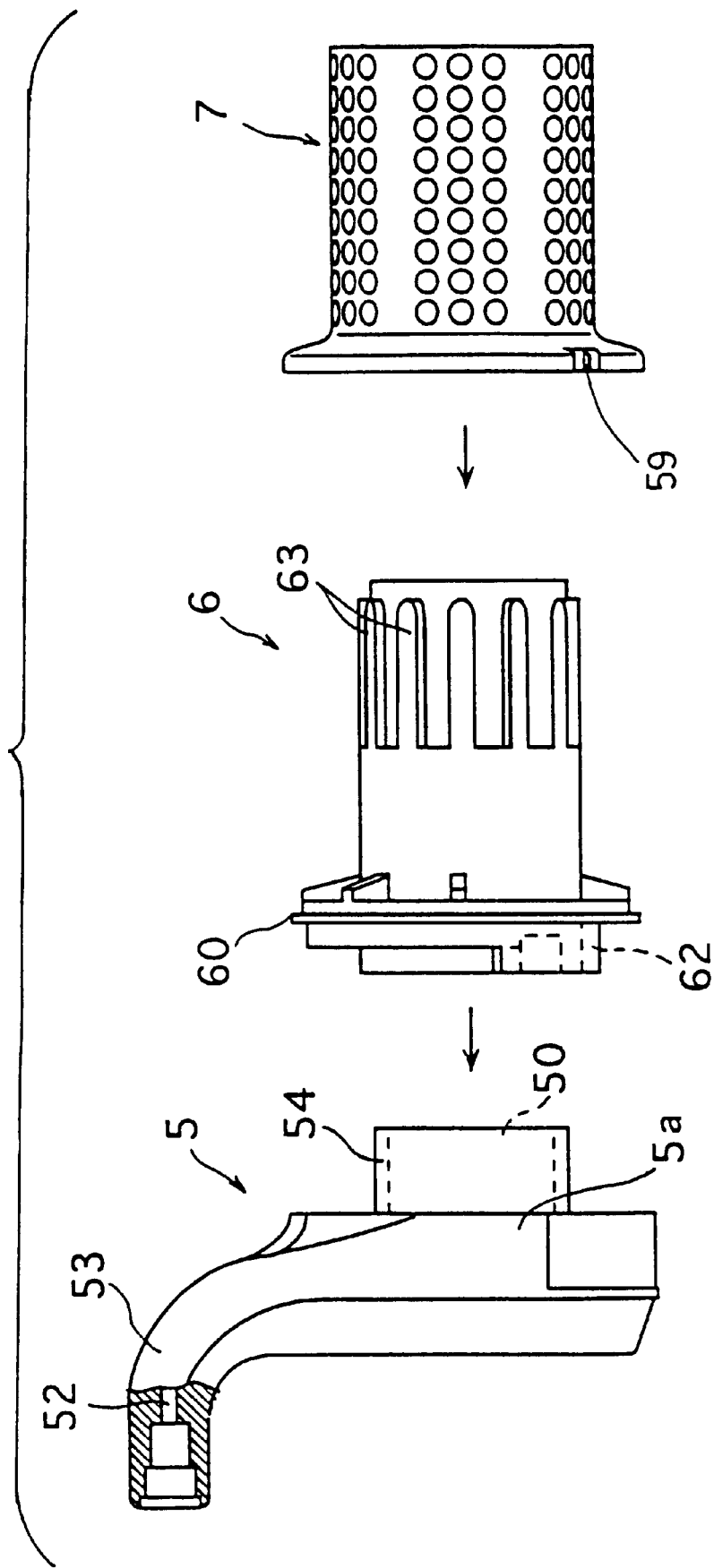

BICYCLE AND BICYCLE SPEED CHANGE OPERATION ASSEMBLY

TECHNICAL FIELD

The present invention relates to a bicycle equipped with a front speed shifter and a rear speed shifter, and to a bicycle speed change operation assembly.

BACKGROUND ART

A bicycle equipped with a speed shifter such as a derailleur and a hub gear is commonly equipped with a speed change operation assembly connected to the speed shifter via a control cable. Desired speed change operation is performed by operating the speed change operation assembly. In such a bicycle it is desirable for a rider to be able to know easily what speed stage he is using. Thus, a conventional speed change operation assembly has a scale showing the speed positions such as first gear and second gear.

Recently, bicycle speed shifter tends to have an increasing number of speed stages. Especially, a sports type bicycle is now commonly equipped with a front speed shifter having two or a greater number of speed stages, and with a rear speed shifter having three or a greater number of speed stages. However, such a bicycle having a front and a rear speed shifters is only equipped with a pair of speed change operation assemblies for respective front and rear speed shifters, and each speed change operation assembly is provided with a scale solely showing the speed stages of its own speed shifter.

This type of conventional arrangement in which each of the two speed change operation assemblies only has an individual scale for its own speed stages has following problems:

Reference is now made to FIG. 15, which shows an enlarged plan view of a primary portion of a bicycle equipped with a front derailleur (not shown) capable of shifting a chain 4A between three front gears F1 through F3, and a rear derailleur (not shown) capable of shifting a chain 4A between six rear gears R1 through R6. In this bicycle, chain 4A currently engages with front gear F1 and rear gear R4. If a speed change operation to a lower speed stage is to be made, it is more desirable to shift a front portion of chain 4A to the front gear F2 than shifting a rear portion of chain 4A to the rear gear R5 or R6, because as shown in the phantom line in FIG. 12, shifting the chain 4A to the rear gear R5 or R6 will increase an engagement angle θ of chain 4A, resulting in noise or easy disengagement of chain due to poor engagement between the chain and the gears. In addition, the service life of chain 4A will be shortened because the chain 4A is subjected to lateral forces other than tension.

There is another problem if the rear portion of chain 4A is shifted to the rear gear R6: A speed change operation to a further lower speed stage can no longer be achieved by operating the rear derailleur, and therefore, a front portion of the chain 4A must be shifted to the front gear F2. If there is still further need to shift down, the only option is to shift the front portion of chain 4A to the front gear F3. This type of speed change operation practice only makes use of large gear ratios between front gears, making unavailable the access to more advantageous 6 speed options provided by the rear gears R1 through R6 having a smaller gear ratios for finer speed control.

As exemplified in the above, in a bicycle equipped with a front speed shifter and a rear speed shifter, there are certain favorable and unfavorable combinations of a front speed stage and a rear speed stage.

However, in a conventional bicycle, the front speed stage and the rear speed stage can only be confirmed individually. The rider cannot know easily how he can advantageously combine a front speed stage with a rear speed stage. Even if he knows favorable combinations, it is still very difficult for him to make such a setting quickly while riding on a bicycle.

DISCLOSURE OF THE INVENTION

It is therefore an object of the present invention to provide easy means for a bicycle rider to make a favorable gear combination between a speed stage of a front speed shifter and a speed stage of a rear speed shifter. Another object of the present invention is to provide easy means for routing the control cable preferably for a bicycle speed change operation assembly connected with a front speed shifter or rear speed shifter by a cable.

According to a first aspect of the present invention, a bicycle comprises a front speed shifter having a plurality of speed stages, a rear speed shifter having at least three speed stages, a front speed change operation assembly connected to the front speed shifter, and a rear speed change operation assembly connected to the rear speed shifter. There are a plurality of designated groups of combinations for combining the speed stages of the front speed shifter with the speed stages of the rear speed shifter, and indication means for identifying each of these groups is provided for each of the front speed change operation assembly and the rear speed change operation assembly.

According to a second aspect of the present invention, a bicycle speed change operation system comprises a front speed change operation assembly connected to a front speed shifter having a plurality of speed stages, and a rear speed change operation assembly connected to a rear speed shifter having at least three speed stages. There are a plurality of designated groups of combinations for combining the speed stages of the front speed shifter with the speed stages of the rear speed shifter, and indication means for identifying each of these groups is provided for each of the front speed change operation assembly and the rear speed change operation assembly.

According to the present invention, if the bicycle rider follows the indication given by the above indication means when operating the front speed change operation assembly or the rear speed change operation assembly, a resulting combination between a front speed stage and a rear speed stage will belong to a designated group. On the other hand, the above indication means can keep the combination between a front speed stage and a rear speed stage within the designated favorable range. As a result, according to the present invention, the bicycle rider can easily achieve a favorable combination between a front speed stage and a rear speed stage by following the indications given by the indication means.

According to a preferred embodiment of the present invention, the indication means comprises a first group of differently colored indicator marks each corresponding to a respective speed stage of the front speed shifter, and a second group of differently colored indicator marks each corresponding to plural speed stages of the rear speed shifter. The color of each indicator mark in the first group is similar to the color of one indicator mark in the second group for showing recommended combinations of each speed stage of the front speed shifter with a plurality of speed stages of the rear speed shifter.

According to the above arrangement, it is possible to make a designated favorable combination of a front speed stage and a rear speed stage by operating the front speed change operation assembly or the rear speed change operation assembly so that a color of the first group of indicator marks is the same with the color of the second group of indicator marks. In this way, by judging from the colors of the indicator marks, the rider can easily know what favorable speed change options are available at any time.

According to another preferred embodiment of the present invention, the speed change operation assembly comprises a grip-type operation member rotatably fitted around an end portion of the handlebar. In this embodiment, the grip-type operation member of the front speed change operation assembly and the grip-type operation member of the rear speed change operation assembly are designed such that the front speed shifter and the rear speed shifter are equally shifted to either one of a higher speed stage or a lower speed stage when they are rotated in the same direction.

The above arrangement can reduce possibilities for mis-operation when a speed change is made to a lower or a higher speed stage because each of the front speed change operation assembly and the rear speed change operation assembly is rotated in an identical direction.

According to a third aspect of the present invention, the bicycle speed change operation assembly comprises a housing fitted around a bicycle handlebar and having a projecting wire-guide portion for guiding an inner wire of a control cable, and a wire reel fitted around the handlebar for rotation relative to the housing and having an engaging recess for retaining a nipple provided at an end of the inner wire. The housing has a through-hole for allowing insertion of the inner wire longitudinally of the handlebar. The housing further has a through-slit penetrating from one side to an opposite side of the housing and communicating with the through-hole, thereby allowing the nipple of the inner wire to enter into the retaining recess of the wire reel. The wire-guide portion has a guide groove for introducing a portion of the inner wire inserted through the through-hole into the wire-guide portion.

Thus, according to the present invention, the inner wire of the control cable can be routed in the following manner: First, the inner wire is inserted into the through-hole from one side of the housing to the opposite side of the housing. Next, the nipple provided at an end of the inner wire is engaged with the engaging recess of the wire reel. This process is achieved by passing the nipple through the through-hole of the housing. Thus, even when a wire reel has already been mounted at one side of the housing, it is still possible to engage the nipple with the engaging recess of the wire reel from the opposite side of the housing without removing the wire reel from the housing. Further, a portion of the inner wire closer to wire mid-point than the end nipple can be appropriately guided into the wire guide by using the guide groove provided at the wire-guide portion.

Thus, according to the above arrangement, the inner wire of the control cable can be connected to the bicycle speed change operation assembly quickly and easily without separating the wire reel from the housing.

According to the embodiment of the present invention, the through-hole is sized for allowing passage of the nipple of the inner wire, and the guide groove is formed along the entire length of the wire-guide portion.

According to the above arrangement, the inner wire provided with the nipple can be passed through the through-hole of the housing together with the nipple. Likewise, the inner wire mounted in the through-hole can be pulled out of the through-hole together with the nipple. Further, a portion of the inner wire can be introduced into the wire-guide portion of the housing by simply laying that particular portion into the guide groove formed along the entire length of the wire-guide portion. Thus, routing of the inner wire can be further facilitated.

Again according to the embodiment of the present invention, the engaging recess of the wire reel has a wall facing the head of the nipple retained by the engaging recess.

According to the above arrangement, even when the inner wire has difficulty following the movement of the wire reel for some reason, the nipple can be contacted by said wall of the engaging recess, thereby forcibly pushed in a direction of rotation of the wire reel, forcing the inner wire to move in a desired direction. This can improve operation reliability of the bicycle speed change operation assembly.

According to still another embodiment of the present invention, the wire-guide portion is curved to extend longitudinally of the handlebar so that an end portion of the inner wire partially guided by the wire-guide portion is elastically urged toward retaining recess for retention therein.

According to the above arrangement, the end of the inner wire can be positively fitted in the engaging recess by simply fitting a portion of the inner wire into the curved wire-guide portion. Thus, it is possible, without using any additional members, to prevent the nipple at the end of the inner wire from disengaging therefrom.

Other features and advantages of the present invention will become apparent from the following description of the preferred embodiment given with reference to the accompanying drawings.

BRIEF DESCRIPTION OF THE DRAWINGS

FIG. 7 is an explosive front view showing constitutional members of the bicycle speed change operation assembly.

BEST MODE FOR CARRYING OUT THE INVENTION

An embodiment of the present invention is described below with reference to the accompanying FIGS. 1 through 14.

Figure 1:
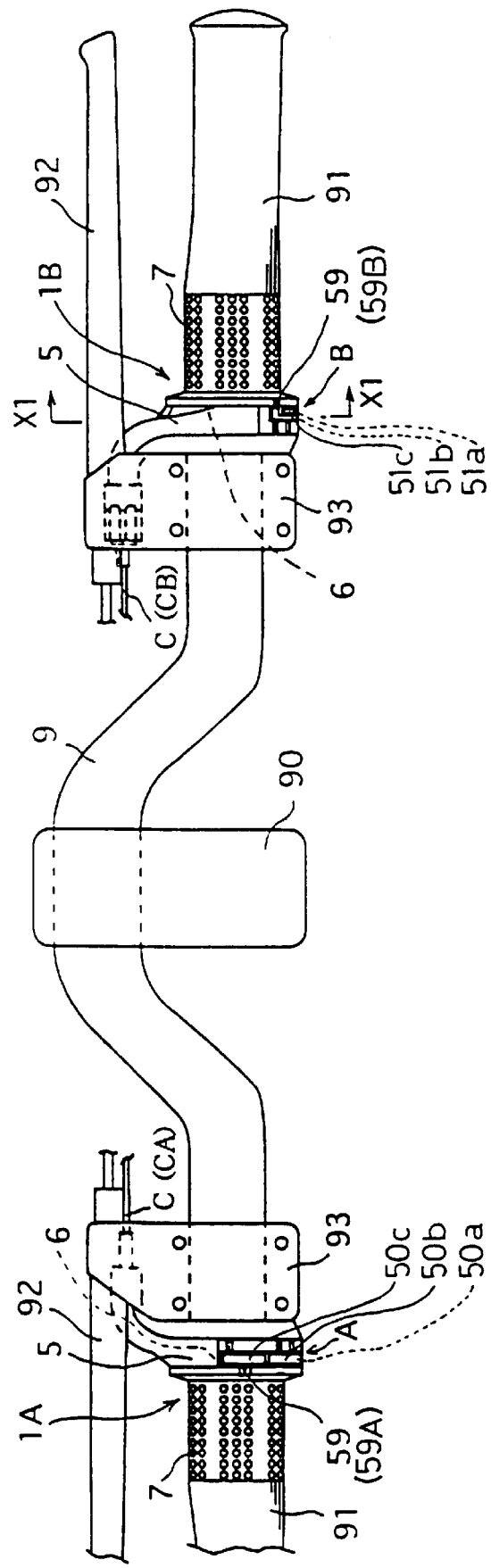
FIG. 1 is a plan view showing a primary portion a bicycle speed change operation assembly according to the present invention.

A bicycle speed change operation system shown in FIG. 1 comprises a front speed change operation assembly 1A and a rear speed change operation assembly 1B. Each of the front speed change operation assembly 1A and the rear speed change operation assembly 1B is located between a handle grip 91 fitted at an end portion of the handlebar 9 and a bracket 93 of a brake lever 92.

Figure 4:
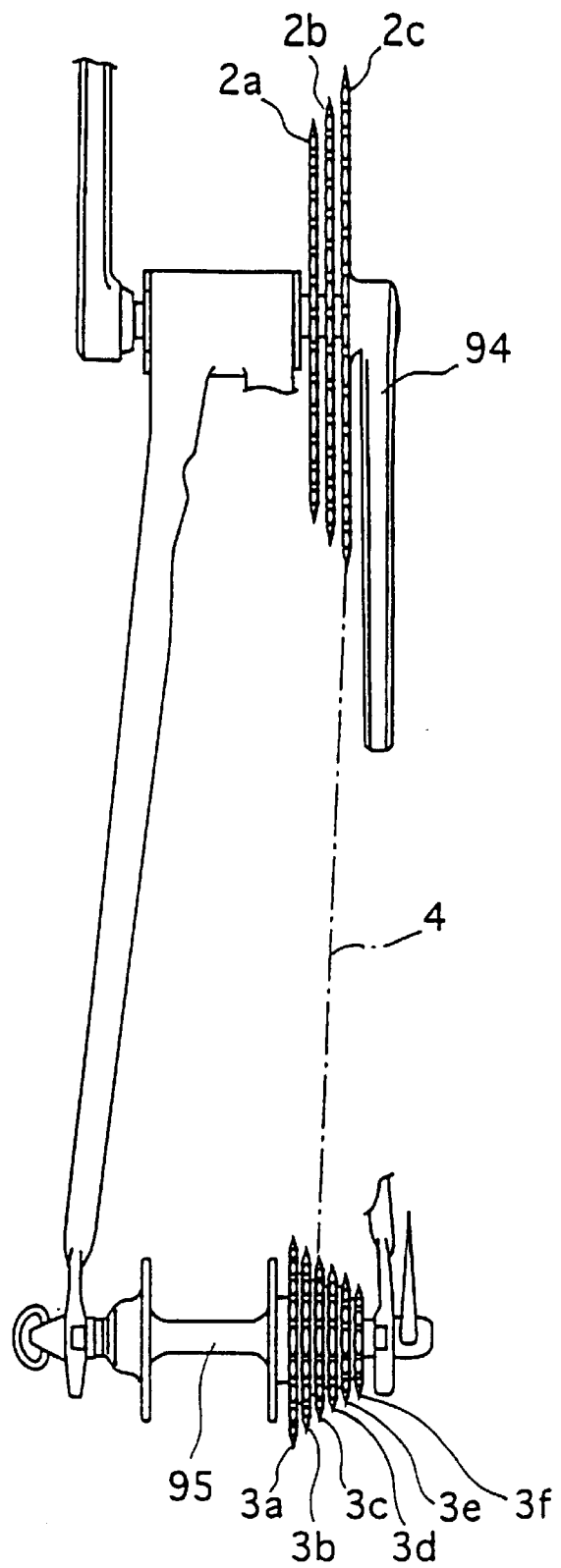
FIG. 4 is a plan view showing a primary portion of a bicycle driving mechanism for chain shift operation by the bicycle speed change operation assembly shown in FIG. 1.

The front speed change operation assembly 1A is used for operating a front derailleur (not shown) for shifting a chain 4 between front gears 2a through 2c driven by a crank arm 94 shown in FIG. 4. The front derailleur and the front speed change operation assembly 1A are mutually connected by a control cable C (CA). The front derailleur is a conventional type. More particularly, this front derailleur has a shifter for moving the chain 4 width-wise of the bicycle in correspondence to the amount of pull of the control cable C (CA).

The rear speed change operation assembly 1B is used for operating a rear derailleur (not shown) for shifting a chain 4 between six-stage rear gears 3a through 3f fitted to a rear hub 95. The rear derailleur and the rear speed change operation assembly 1B are mutually connected by a control cable C (CB). The rear derailleur again, is a conventional type. More particularly, this rear derailleur has a guide pulley for moving the chain 4 width-wise of the bicycle in correspondence to the amount of pull of the control cable C (CB), and a tension pulley for removing slack in the chain 4.

Figure 6:
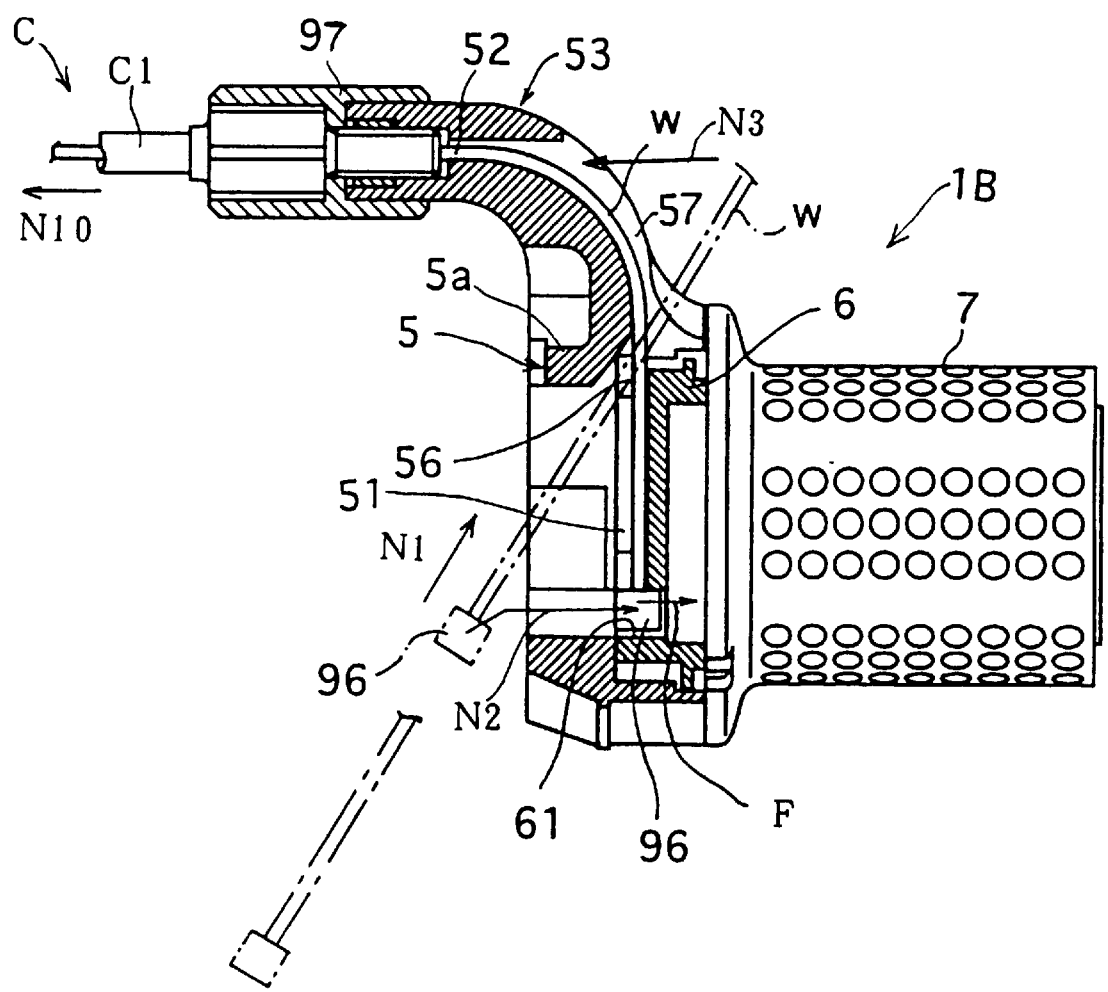
FIG. 6 is a sectional view taken on lines X2—X2 in FIG. 5.

As shown in FIG. 6, each of the control cable C comprises an inner wire W and an outer sheath Cl which is a tube provided for guiding the inner wire W. An end of the inner wire W is connected to a respective derailleur. The inner wire W is under a constant pull toward the derailleur (in a direction shown by Arrow N10) by an elastic force of a spring (not shown) of the derailleur.

The front speed change operation assembly 1A and the rear speed change operation assembly 1B are primarily the same in constitution. For the convenience of description, therefore, reference is only made to the rear speed change operation assembly 1B in the following description.

Figure 5:
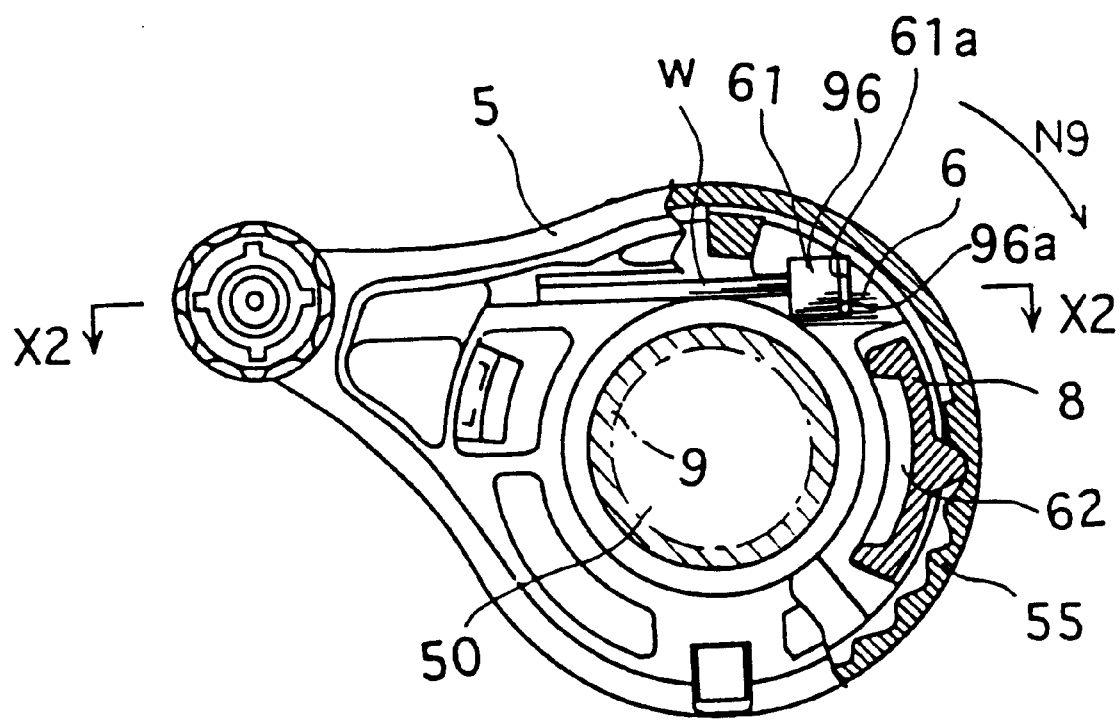
FIG. 5 is a sectional view taken on lines X1—X1 in FIG. 1.

The rear speed change operation assembly 1B comprises a housing 5, wire reel 6, and grip-type operation member 7 each shown in FIG. 7, and such other members as a pawl member 8 shown in FIG. 5.

Figure 8A:
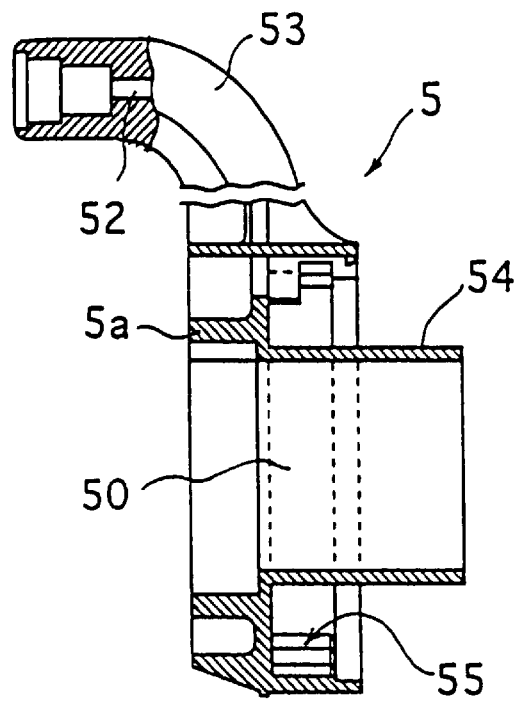
FIG. 8a is a sectional view showing a primary portion of the housing.
Figure 8B:
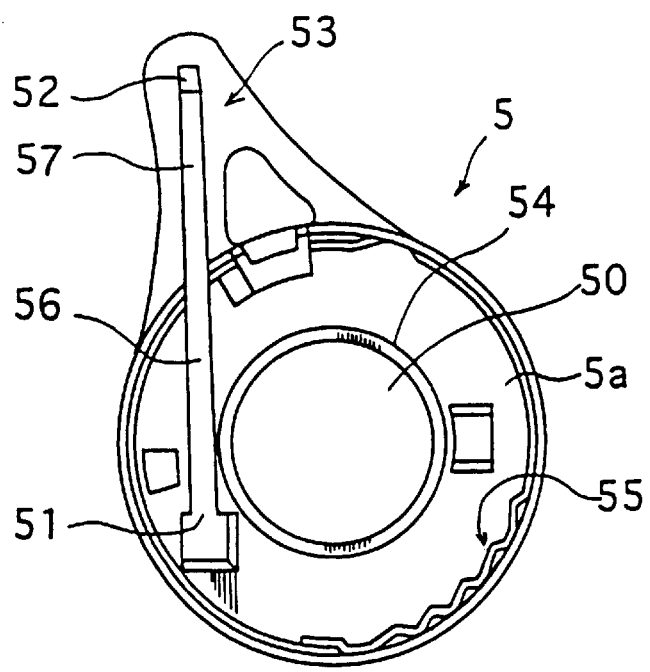
FIG. 8b is a right-side view thereof.

The housing 5 receives the wire reel 6, and guides the control cable C. As shown in FIGS. 8a, 8b, the housing 5 includes a cylindrical housing body 5a fitted around the handlebar 9, and a wire-guide portion 53 projecting from the housing body 5a. A cylindrical portion 54 of the housing body 5a allows rotation of the wire reel 6 relative to the housing 5. The wire-guide portion 53 curving toward a side of the housing 5 has a guide hole 52 for guiding the inner wire W of the control cable C.

As shown in FIG. 6, the housing body 5a is provided with a through-hole 56 for passing the inner wire W width-wise of the housing (longitudinally of the handlebar 9), through-slit 51 communicating with the through-hole 56, guide groove 57, and other portions to be described later.

In this particular embodiment, however, the through-slit 51 includes the through-hole 56 so the two portions merge with each other making it difficult to identify each from the other. The through-slit 51 is formed from one side to the opposite side of the housing 5. The guide groove 57 is formed longitudinally of the wire-guide portion 53 for connecting the wire-guide hole 52 with the through-slit 51.

Figure 9A:
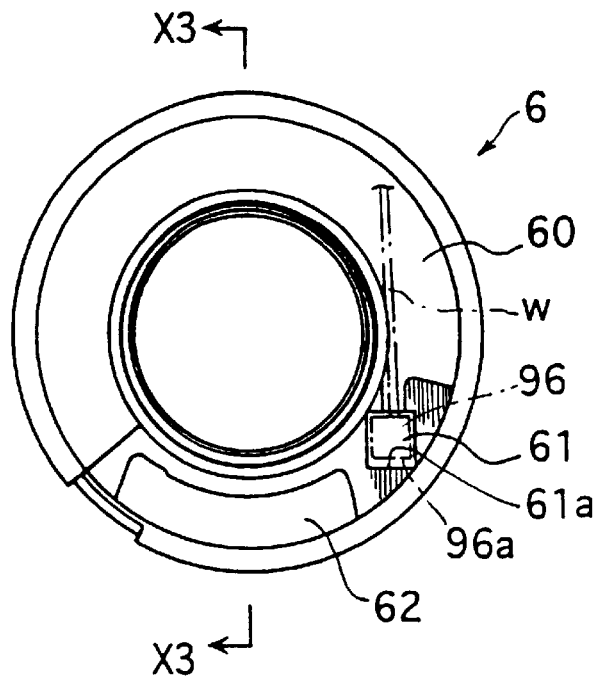
FIG. 9a is a side view showing a wire reel.
Figure 9B:
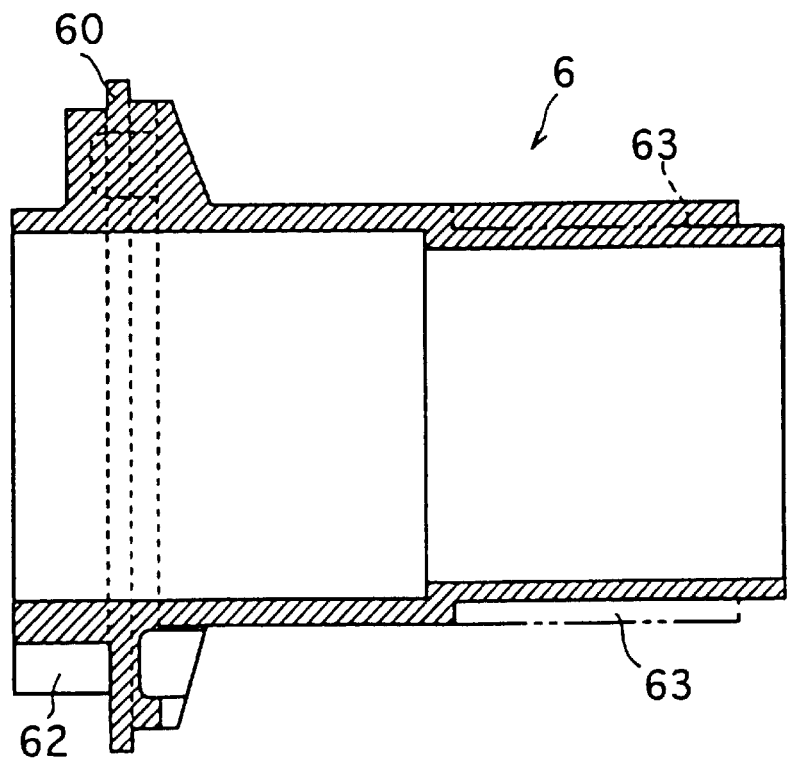
FIG. 9b is a sectional view taken on lines X3—X3 therein.

The wire reel 6 is for winding (pulling) or unwinding the inner wire W. This wire reel 6 has a generally cylindrical shape with a flange portion 60. As shown in FIG. 9a, an end face of the wire reel is formed with an engaging recess 61 for receiving a nipple 96 fitted to an end of the inner wire W. As indicated by the phantom line in the figure, the engaging recess 61 is formed with a wall portion 61a facing a head portion 96a of the nipple 96 when the nipple 96 is engaged with the engaging recess 61.

Figure 10A:
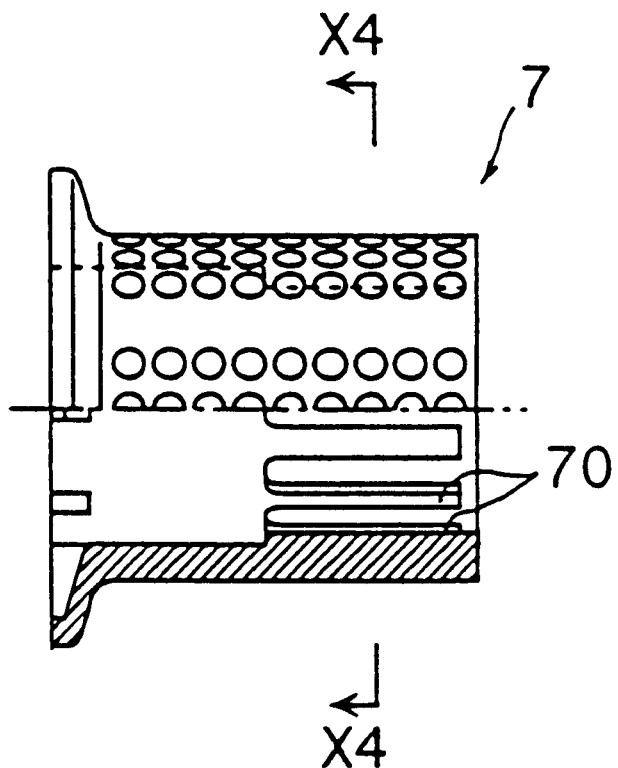
FIG. 10a is a side view with partial section showing a grip-type operation member.
Figure 10B:
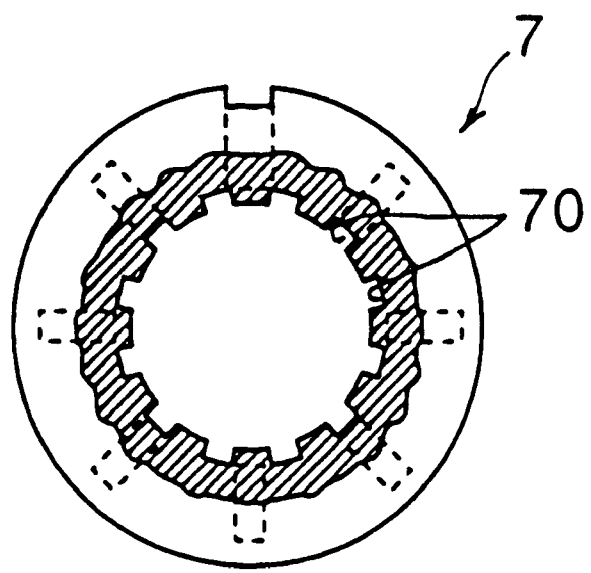
FIG. 10b is a sectional view taken on lines X4—X4 therein.

The grip-type operation member 7 is for rotating the wire reel 6. As shown in FIGS. 10a, 10b, the grip-type operation member 7 is generally formed in a cylindrical shape for fitting around the wire reel 6. The wire reel 6 and the housing is made of a synthetic resin for example, whereas the grip-type operation member 7 is made of a synthetic rubber for example, for reducing slip on the rider's hand. For the same purpose, the grip-type operation member 7 is formed with a non-slip embossing pattern on its outer surface. In the inner surface of the grip-type operation member 7, a spline groove 70 is formed for fitting into a spline groove 63 formed on the outer surface of the wire reel 6.

Thus, when the grip-type operation member 7 is fitted around the wire reel 6, their relative rotation is prohibited, and they only rotate together.

The rear speed change operation assembly 1B is constituted by the above-described parts. Assembly can start from a state shown in FIG. 7 wherein the cylindrical portion 54 of the housing 5 is fitted with an end portion of the wire reel 6. The other end of the wire reel 6 is fitted by the grip-type operation member 7. As shown in FIG. 1, each of these members is fitted around the handlebar 9. In this particular embodiment, the location of the housing 5 is more inwardly of the bicycle width than grip-type operation member 7 or the wire reel 6. It should be noted that the assembling process of the rear speed change operation assembly 1B includes steps for assembling a click mechanism shown in FIGS. 12, 13, to be described later in detail.

After assembling the rear speed change operation assembly 1B, the control cable C (CB) can be fitted to the rear speed change operation assembly 1B in the following procedure:

First, as shown by the phantom line in FIG. 6, the inner wire W fitted with the nipple 96 is inserted from a side of the housing 5 into the through-hole 56 as shown by Arrow N1. Next, the nipple 96 is inserted in a direction shown by Arrow N2 into the through-slit 51 of the housing 5. This causes the nipple 96 to fit into the engaging recess 61 of wire reel 6 facing the through-slit 51.

After passing the end portion of the inner wire W through the through-hole 56, the remaining portion of the inner wire is curved in a direction shown in Arrow N3 and then, inserted through the guide groove 57 into a guide hole 52 of the wire-guide portion 53, and then, pulled out of the tip of the wire guide portion 53. Then, the outer sheath C1 of the inner wire W is fastened by an appropriate fastener 97 to the tip portion of the wire-guide portion 53.

A series of routing operation of the control cable C can be performed without disassembling the wire reel 6 from the housing 5 if there is an appropriate space at one side of the rear speed change operation assembly 1B. More specifically, if the rear speed change operation assembly 1B is mounted around the handlebar 9 as shown in FIG. 1, and if the housing 5 is mounted too close to the brake lever bracket 93, the bracket 93 may be slid in order to provide enough space between the bracket 93 and the housing 5 for installing the control cable C. Since there is no need for disassembling the rear speed change operation assembly 1B, the routing work of the control cable C can be performed easily and quickly.

When the portion of inner wire W guided by the wire-guide portion 53 is curved in the direction N3, an elastic force F reacting in the opposite direction of N3 develops at the end of the inner wire W. Thus, the nipple 96 of the inner wire W is always urged by the elastic force F into the engaging recess 61 of the wire reel 6. This prevents the nipple from accidentally escaping from the engaging recess 61.

Figure 11:
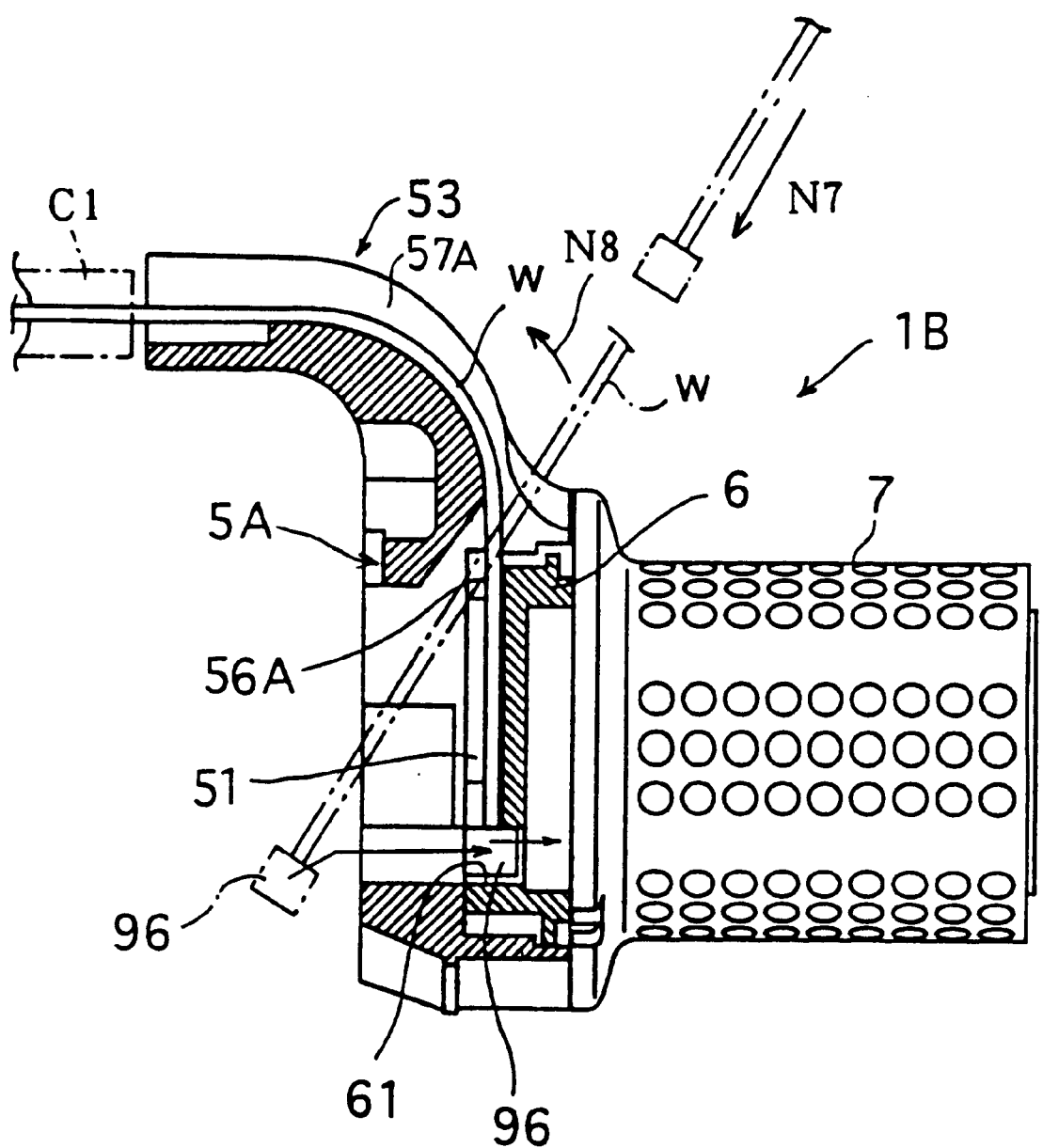
FIG. 11 is a view with partial section showing a primary portion of another bicycle speed change operation assembly according to the present invention.

The rear speed change operation assembly 1B may have a housing 5A as shown in FIG. 11. In this housing 5A, a through-hole 51A communicating with the through-slit 51 is sized to allow passage of the nipple 96 of the inner wire W. In addition, a guide groove 57A is formed along the entire length of the projecting wire-guide portion 53 of the housing 5A.

If the rear speed change operation assembly 1B includes the housing 5A, it is possible to insert the inner wire W fitted with the nipple 96 into the through-hole 56 of the housing 5A from a direction indicated by Arrow N7. Thus, the nipple 96 of the inner wire W can be easily engaged with the engaging recess 61 of the wire reel 6. In addition, by curving a portion of the inner wire W in a direction indicated by Arrow N8, the inner wire W can be appropriately guided by the guide portion 53 for setting into the guide groove 57. Thus, it is possible to route the inner wire W to the rear speed change operation assembly 1B without removing the outer sheath C1.

Figure 12:
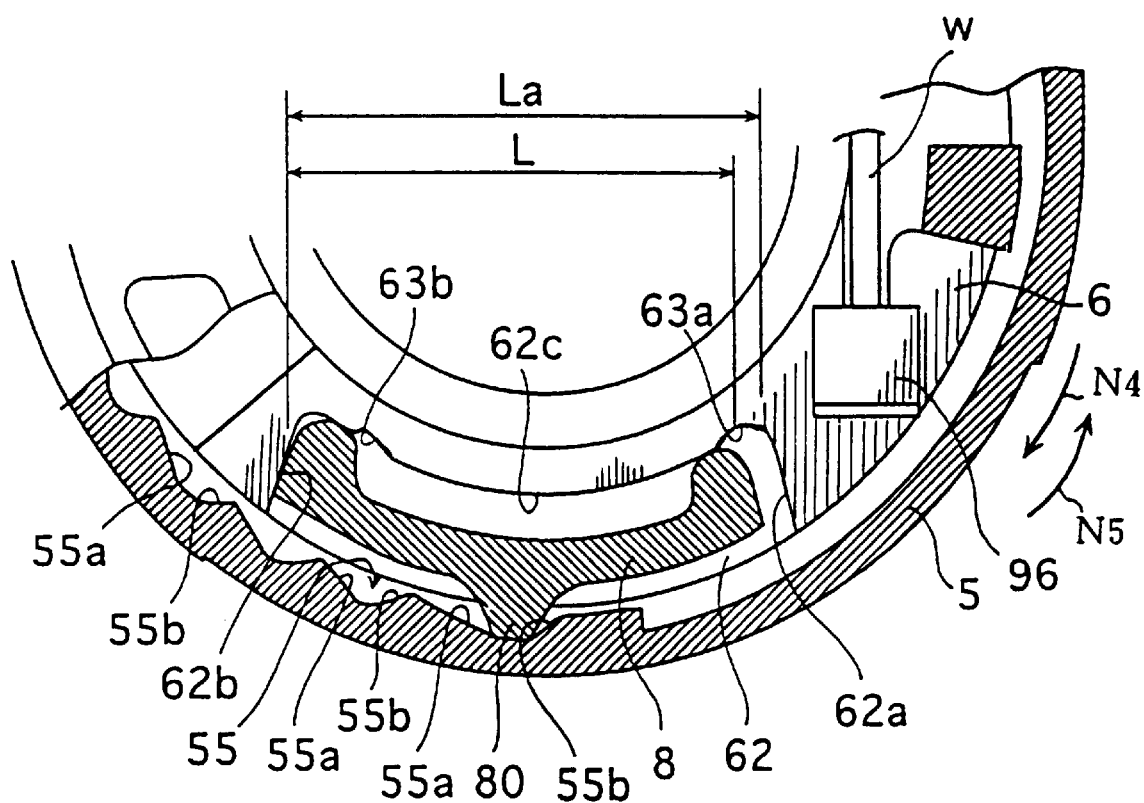
FIG. 12 is a sectional view showing a click mechanism used in the bicycle speed change operation assembly.
Figure 13:
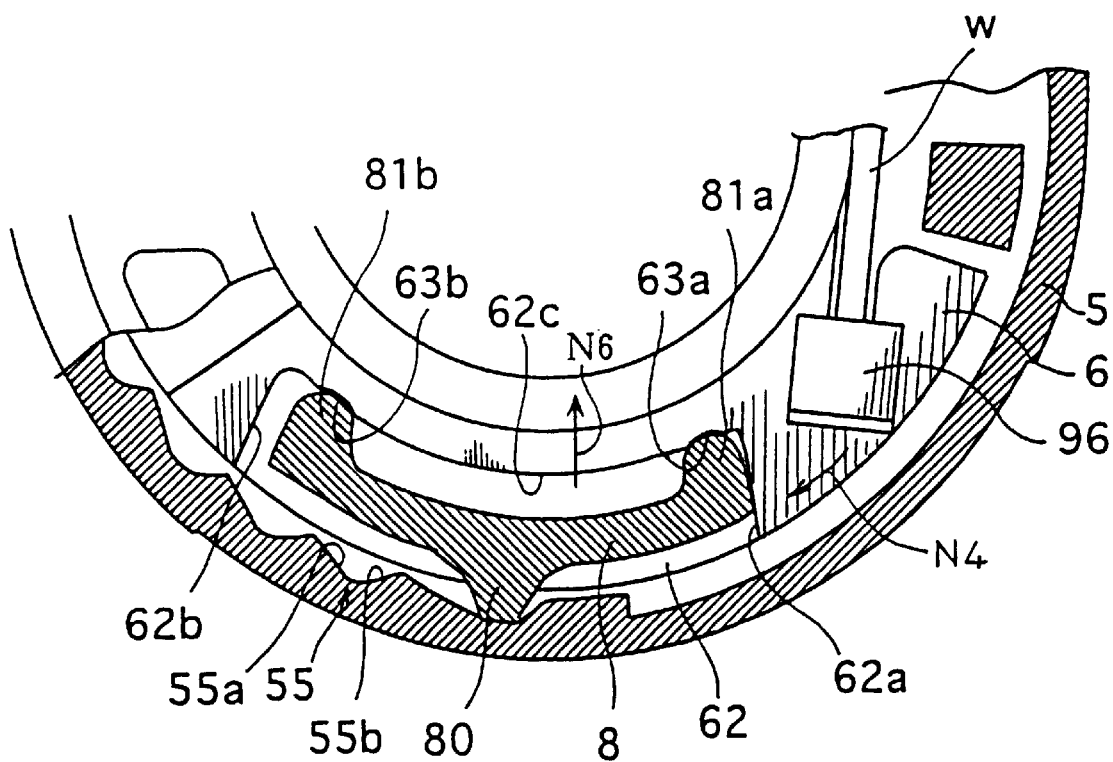
FIG. 13 is an enlarged view of a primary portion of the click mechanism in FIG. 12 showing a state of action of the mechanism.

Next, description is made on the click mechanism referring to FIGS. 12, 13. This click mechanism uses a pawl member 8 fitted into a recess 62 of the wire reel 6 for engagement with a rugged portion 55 formed on the inner wall of the housing 5.

In this click mechanism, when the wire reel 6 rotates in a direction of N4 for winding the inner wire W, or in a direction of N5 for releasing the inner wire W, an end face of the pawl member 8 fitted in a recess 62 of the wire reel 6 is pushed by an inner wall face 62a or an inner wall face 62b of the rugged portion of the wire reel 6. This causes the engaging projection 80 formed on the outer surface of the pawl member 8 to successively engage with a series of recesses of the rugged portion 55 of the housing 5, thereby maintaining consistency in the amount of winding of the inner wire W by the wire reel 6.

A width L of the pawl member 8 is made smaller than a width La of the recess 62. Thus, as shown in FIG. 13, when the inner wall face 62a of the wire reel 6 pushes the pawl member 8 for pulling the inner wire W in the direction N4 and then, the grip-type operation member is released, the spring of the rear derailleur causes the wire reel 6 to rotate reversely, in the opposite direction of N4. As apparent from FIG. 12, this reverse rotation occurs only within a limited range of rotation angle until the inner wall face 62b of the wire reel 6 makes contact with the pawl member 8. This provides the click mechanism with an over-shift feature for assured shifting to a desired gear. In other words, when the inner wire W is pulled for shifting the chain 4, the inner wire W is first pulled more than needed for shifting the chain 4, to a position beyond the desired rear gear. Then, the chain 4 is moved back to the desired rear gear.

In addition, as shown in FIG. 13, the above click mechanism is formed with relief recesses 63a, 63b for receiving respective bulged portions 81a, 81b of the pawl member 8 when one end face of the pawl member 8 makes contact with the inner wall face 62a of the recess 62. Thus, as evident from the figure, this click mechanism has a following feature: During a shifting operation of the chain 4 while the pawl member 8 is being pressed by the inner wall face 62a of the recess 62, the bulged portions 81a, 81b of the pawl member 8 stay at their respective relief portions 63a, 63b, giving relief to the entire pawl member 8 in the direction N6, thereby reducing the amount of force born by the engaging projection 80 of the pawl member 8 being pressed onto the rugged portion 55 of the housing 5. As a result, the grip-type operation member 7 or the wire reel 6 can be rotated by a reduced force. On the other hand, after the chain 4 has been shifted as shown in FIG. 12, the bulged portions 81a, 81b no longer stay at their respective relief portions 63a, 63b, making certain that the engaging projection 80 of the pawl member 8 is retained at the rugged portion 55.

Another feature is that the rugged portion 55 is formed as a combination of two different tapered faces 55a, 55b. Of these tapered faces 55a, 55b, the tapered face 55a is formed to a smaller angle than the other tapered face 55b so as to face the engaging projection 80 of the pawl member 8 when the wire reel 6 is rotated in the direction N4 for pulling the inner wire W. In this click mechanism therefore, the grip-type operation member 7 can be rotated by generally the same amount of force in either direction. In other words, the engaging projection 80 of the pawl member 8 slides on the gentler slope of the tapered face 55a when the inner wire W is being wound against (the pulling force of) the spring of the rear derailleur whereas the engaging projection 80 slides on the steeper slope of the tapered face 55b when the inner wire W is being released toward the pull of the spring. As a result, it is possible to eliminate a substantial difference in operating force when the chain 4 is shifted to a higher or a lower speed stage. This improves operability of the rear speed change operation assembly 1B.

The above description covers the constitution of the rear speed change operation assembly 1B. The front speed change operation assembly 1A has fundamentally the same constitution and therefore, is not be described herein in the same detail.

However, it should be noted that the rear speed change operation assembly 1B is set to top-normal whereas the front speed change operation assembly 1A is set to low-normal. More specifically, in the rear speed change operation assembly 1B, the chain 4 engages with the gear 3f (top gear) which is the outermost gear when the inner wire W is not pulled. On the other hand, in the front speed change operation assembly 1A, the chain 4 engages with the gear 2a (low gear) which is the inner-most gear when the inner wire W is not pulled.

In addition, as shown in FIG. 5, the inner wire W passes above the handlebar 9 for connection to the wire reel 6 in the rear speed change operation assembly 1B. Thus, when the grip-type operation member 7 and the wire reel 6 in the rear speed change operation assembly are rotated backwardly (Direction N9), the inner wire W is wound around the wire reel 6 for successive speed change to a lower steed stage.

On the other hand, contrary to the above rear speed change operation assembly 1B, the inner wire W of the front speed change operation assembly 1A passes below the handlebar 9 for connection to the wire reel (not shown). Thus, in the front speed change operation assembly 1A, when the grip-type operation member and the wire reel are rotated toward backwardly, the inner wire W is released toward the front derailleur for successive speed change to a lower steed stage.

After all, the direction of rotation of the grip-type operation member 7 in each of the front speed change operation assembly 1A and the rear speed change operation assembly 1B for shifting either one of a higher speed stage and a lower speed stage is the same. Such arrangement helps eliminating possibilities for a bicycle rider to operate the front speed change operation assembly 1A or a rear speed change operation assembly 1B in a wrong direction during the speed change operation.

Referring again to FIG. 5, when the grip-type operation member 7 of the rear speed change operation assembly 1B is rotated in the reverse direction of N9 for releasing the inner wire W toward the rear derailleur, it is possible to bring the wall face 61a of the engaging recess 61 of the wire reel into contact with the head portion 96a of the nipple 96. If the inner wire W does not slides back smoothly toward the rear derailleur due to poor slippage between the inner wire W and the outer sheath C1, the wall face 61a of the engaging recess 61 may be used for pushing the head portion 96a of the nipple 96 for facilitating the release action of the inner wire W.

Figure 2:
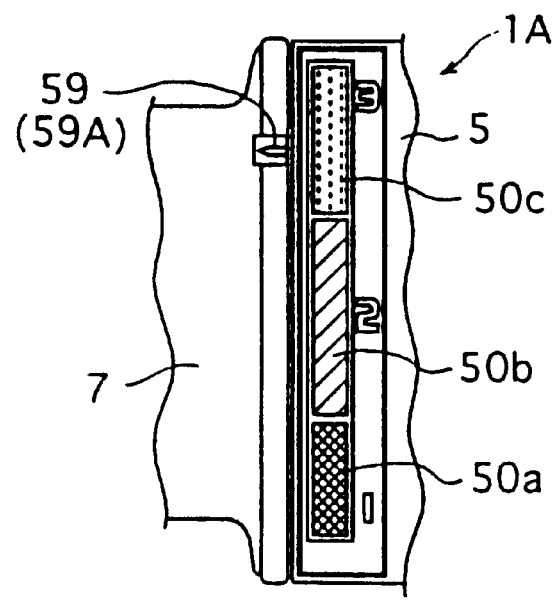
FIG. 2 is an enlarged plan view of portion A in FIG. 1.

As shown in FIG. 2, the outer surface of the housing 5 of the front speed change operation assembly 1A is provided with a first scale having numerical figures one (1) through three (3), as well as a first group of indicator marks 50a through 50c of three different colors. The first scale refers to the speed stages of the front derailleur in relation with the indicator needle 59 (59A) provided in the grip-type operation member 7. The speed stages of this front derailleur are: stage "1" when the chain 4 shown in FIG. 4 is on the front gear 2a, and stages "2" and "3" when the chain 4 is on the front gears 2b and 2c respectively. The indicator marks 50a through 50c respectively correspond to the numerical indications of the first scale (i.e. speed stages 1 through 3 of the front derailleur). Each of the indicator marks 50a through 50c of the first group is given a different color from the others, for example, blue, green and red.

Figure 3:
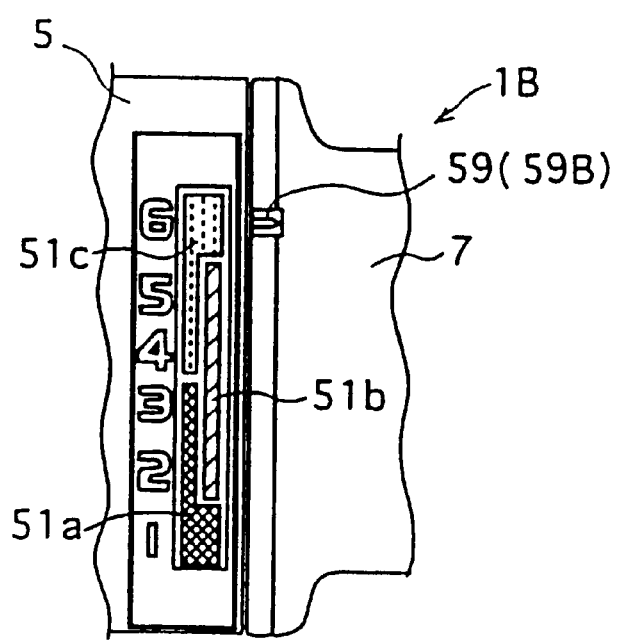
FIG. 3 is an enlarged plan view of portion B in FIG. 1.

As shown in FIG. 3, the outer surface of the housing 5 of the rear speed change operation assembly 1B is provided with a second scale having numerical figures one (1) through six (6), as well as a second group of indicator marks 51a through 51c in the three colors. The second scale refers to the speed stages of the rear derailleur in relation with the indicator needle 59 (59B) provided in the grip-type operation member 7. The speed stages of this rear derailleur are: stage "1" when the chain 4 shown in FIG. 4 is on the rear gear 3a, and stages "2" through "6" when the chain 4 is on the rear gears 3b through 3c respectively.

The indicator marks 51a through 51c respectively correspond to the numerical indications of the second scale (i.e. speed stages "1" through "6" of the rear derailleur) as well as to the indicator marks 50a through 50c of the first group. More specifically, the indicator mark 51a of the second group corresponds to the numerical indicators "1" through "3" of the second scale and therefore, colored in the same blue as is the indicator mark 50a of the front speed change operation assembly 1A.

Another indicator mark 51b corresponds to the numerical indicators "2" through "5" of the second scale and therefore, colored in the same green as is the indicator mark 50b of the front speed change operation assembly 1A. The other indicator mark 51c corresponds to the numerical indicators "4" through "6" of the second scale and therefore, colored in the same red as is the indicator mark 50c of the front speed change operation member 1A.

The indicator marks 50a through 50c of the first group and the indicator marks 51a through 51c of the second group are for differentiating plural groups of favorable combinations by color.

More specifically, if the color of one of the indicator marks 50a through 50c pointed by the indicator needle 59 (59A) of the first group is the same color as the color of one of the indicator marks 51a through 51c pointed by the indicator needle 59 (59B) of the second group, a resulting combination of a front derailleur speed stage and a rear derailleur speed stage is a favorable combination.

Each of the above indicator marks may be a colored decal adhered on the outer surface of the housing 5, or may be direct color painting or printing for example.

Next, description is made on a speed change operation on a bicycle equipped with the front speed change operation assembly 1A and the rear speed change operation assembly 1B.

When a front portion of the chain 4 is on the front gear 2c as shown in FIG. 4 for example, indications on the front speed change operation assembly 1A is as shown in FIG. 2, namely, the front derailleur speed stage "3" and the red indicator mark 50c are pointed by the indicator needle 59 (59A). Now, if the bicycle rider is to change speed by operating the rear speed change operation assembly 1B, he should operate so that the indicator needle 59 (59B) points the same color as the indicator mark 50c, that is, the indicator mark 51c of the indicator marks 51a through 51c of the second group shown in FIG. 3.

This operation brings a rear portion of the chain 4 to one of the rear gears 3d through 3f, and not any one of the rear gears 3a through 3c, avoiding the situation where the chain 4 is engaged with a front and a rear gears at a large engagement angle. Thus, it is possible to eliminate noise or easy disengagement of chain 4 due to poor engagement between the chain 4 and the gears. It also makes possible to increase the service life of chain because the chain is not subjected to lateral forces.

Now, if a speed change operation to a lower speed stage is to be made under a situation where the front speed change operation member 1A is currently set to the speed stage "3" and the rear speed change operation assembly 1B is currently set to the speed stage "4" for example, a recommended procedure is to operate the front speed change operation assembly 1A to the speed stage "2". In this operation, the indicator needle 59 (59B) of the rear speed change operation assembly 1B stays on the red indicator mark 51c and the green indicator mark 51b, whereas the indicator needle 59 (59A) of the front speed change operation assembly 1A is moved to point the indicator mark 50b which is green. Thus, the speed change operation to a lower speed stage can be performed without making the colors of the front speed change operation member 1B and the front speed change operation member 1A differing from each other. Once the speed stage "2" is selected on the front speed change operation assembly, it is then possible to use only the rear speed change operation assembly 1B for making finer speed change operations by the rear gear 3a through 3f of the 6-stage sprocket.

In this embodiment, the combination groups of the front derailleur speed stages and the rear derailleur speed stages are represented by the colored indicator marks 50a through 50c of the first group and 51a through 51c of the second group, so these marks are very easy for the bicycle rider to recognize and understand.

The scope of the present invention is not limited to the embodiment described hereinabove.

For example, specific combinations of a front derailleur speed stage and rear derailleur speed stages may be designated differently from the embodiment by a bicycle manufacturer or a bicycle dealer. The groups may be differentiated by black and white only, or by different patterns of a single color.

Further, instead of the color or pattern, the numerical figures "1" through "6" of the second group of the rear speed change operation assembly 1B for example, may be accompanied by numbers of a different font or size which represent the recommended speed stages of the front derailleur to be coupled with. In this particular case, the front speed change operation assembly 1A may only have indication means for the speed stages of the front derailleur.

Furthermore, it is not necessary in the present invention to provide the indication means for the front derailleur speed stages and the rear derailleur speed stages directly on the front speed change operation assembly 1A and the rear speed change operation assembly 1B. For example, providing these indication means on the handlebar or other members is still within the scope of the present invention.

Figure 14:
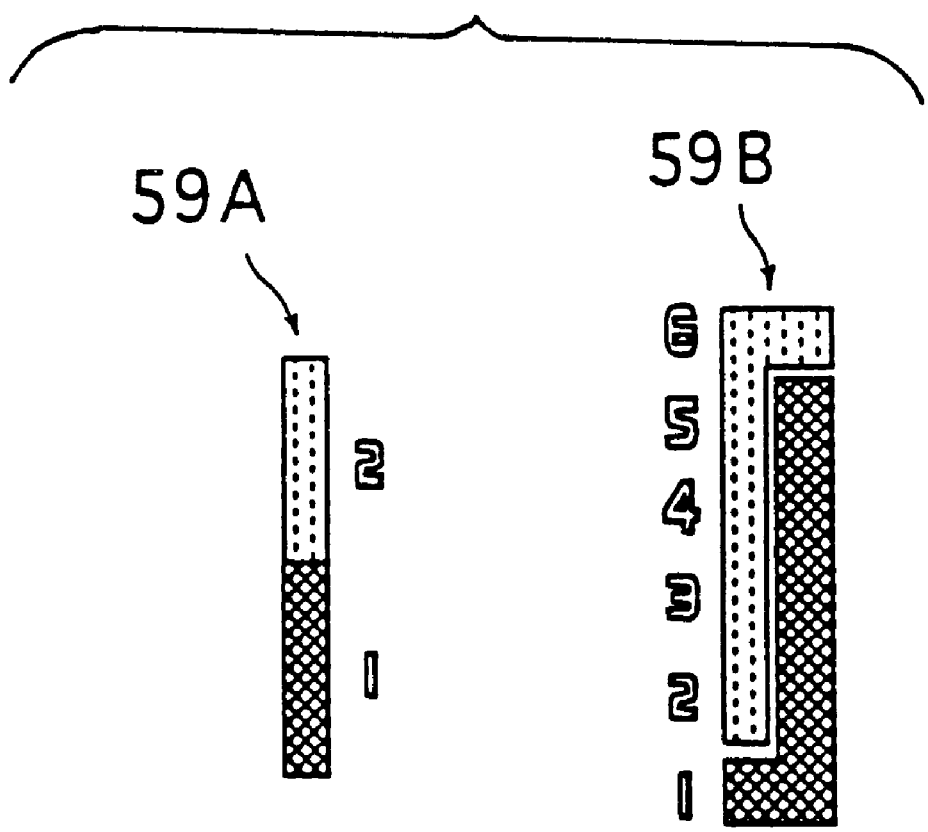
FIG. 14 is a view showing another indication means of the bicycle speed change operation assembly according to the present invention.
Figure 15:
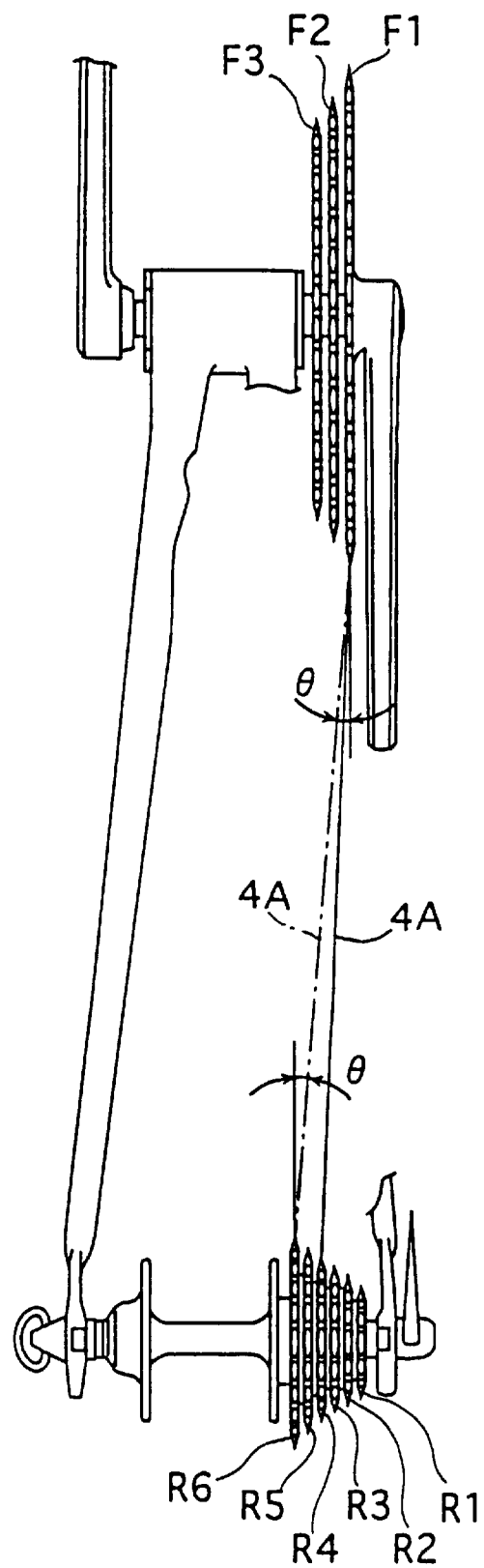
FIG. 15 is a plan view of a primary portion of a conventional bicycle showing an example of chain engagement.

Still further, the present invention is not limited to a type of bicycle equipped with a 3-stage front derailleur and a 6-stage rear derailleur. The present invention allows the use a of hub gear for the speed shifter. The present invention is applicable to a bicycle equipped with a front speed shifter of at least 2 speed stages and a rear speed shifter of at least 3 speed stages, and there is no specific limitation to the number of speed stages of the front speed shifter or the rear speed shifter. If the front speed shifter has two speed stages and the rear speed shifter has 6 speed stages, the indication means 59A, 59B may be as shown in FIG. 14.

In addition, it is possible in the present invention to use a different type of speed change operation assembly such as once equipped with a rod-type control lever for the front speed change operation assembly and the rear speed change operation assembly.

Applicable Field

The bicycle and the bicycle speed change operation assembly according to the present invention is widely applicable to a bicycle equipped with a front speed shifter having at least 2 speed stages and a rear speed shifter having at least 3 speed stages.

What is claimed is:

1. A bicycle comprising; a front speed shifter having a plurality of speed stages, a rear speed shifter having at least three speed stages, a front speed change operation assembly connected to the front speed shifter, and a rear speed change operation assembly connected to the rear speed shifter, wherein there are a plurality of designated groups of combinations for combining the speed stages of the front speed shifter with the speed stages of the rear speed shifter, and wherein indication means for identifying each of these groups is provided for each of the front speed change operation assembly and the rear speed change operation assembly;

wherein the indication means comprises a first group of differently colored indicator marks each corresponding to a respective speed stage of the front speed shifter, and a second group of differently colored indicator marks each corresponding to plural speed stages of the rear speed shifter; the color of each indicator mark in the first group being similar to the color of one indicator mark in the second group for showing recommended combinations of each speed stage of the front speed shifter with a plurality of speed stages of the rear speed shifter.

2. A bicycle speed change operation system comprising: a front speed change operation assembly connected to a front speed shifter having a plurality of speed stages, and a rear speed change operation assembly connected to a rear speed shifter having at least three speed changes, wherein there are a plurality of designated groups of combinations for combining the speed stages of the front speed shifter with the speed changes of the rear speed shifter; and wherein indication means for identifying each of these groups is provided for each of the front speed change operation assembly and the rear speed change operation assembly;

wherein each of the front speed change operation assembly and the rear speed change operation assembly is mounted around a bicycle handlebar and comprises:

a housing having a protecting wire-guide portion for guiding an inner wire of a control cable, and a wire reel fitted around the handlebar for rotation relative to the housing and having an engaging recess for retaining a nipple provided at an end of the inner wire, the housing having a through-hole for allowing insertion of the inner wire longitudinally of the handlebar, the housing further having a through-slit penetrating from one side to an opposite side of the housing and communicating with the through-hole, thereby allowing the nipple of the inner wire to enter into the retaining recess of the wire reel, and the wire-guide portion having a guide groove for introducing a portion of the inner wire inserted through the through-hole into the wire-guide portion.

3. A bicycle speed change operation assembly comprising;

a housing fitted around a bicycle handlebar and having a projecting wire-guide portion for guiding an inner wire of a control cable, and a wire reel fitted around the handlebar for rotation relative to the housing and having an engaging recess for retaining a nipple provided at an end of the inner wire, wherein the housing has a through-hole for allowing insertion of the inner wire longitudinally of the handlebar, the housing further having a through-slit penetrating from one side to an opposite side of the housing and communicating with the through-hole, thereby allowing the nipple of the inner wire to enter into the retaining recess of the wire reel, and the wire-guide portion having a guide groove for introducing a portion of the inner wire inserted through the through-hole into the wire-guide portion;

wherein the through-hole is sized for allowing passage of the nipple of the inner wire, and the guide groove being formed along the entire length of the wire-guide portion.

4. The bicycle speed change operation assembly according to claim 3, wherein the retaining recess of the wire reel has a wall facing the head of the nipple retained by the retaining recess.

5. The bicycle speed change operation assembly according to claim 3, wherein the wire-guide portion is curved to extend longitudinally of the handlebar so that an end portion of the inner wire partially guided by the wire-guide portion is elastically urged toward retaining recess for retention therein.

6. A bicycle comprising; a front speed shifter having a plurality of speed stages, a rear speed shifter having at least three speed stages, a front speed change operation assembly connected to the front speed shifter, and a rear speed change operation assembly connected to the rear speed shifter, wherein there are a plurality of designated groups of combinations for combining the speed stages of the front speed shifter with the speed stages of the rear speed shifter;

wherein indication means for identifying each of these groups is provided for each of the front speed change operation assembly and the rear speed change operation assembly; and wherein each speed change operation assembly comprises a grip operation member rotatably mounted at an end portion of a handlebar.

7. The bicycle according to claim 6, wherein the grip operation member of the front speed change operation assembly and the grip operation member of the rear speed change operation assembly are designed such that when they are rotated in the same direction, the front speed shifter and the rear speed shifter are equally shifted to either one of a higher speed stage and a lower speed stage.

* * * * *